Mar. 27, 1923.
E. PETRICKO.
GRASS CLIPPER.
FILED NOV. 12, 1921.
1,449,438.
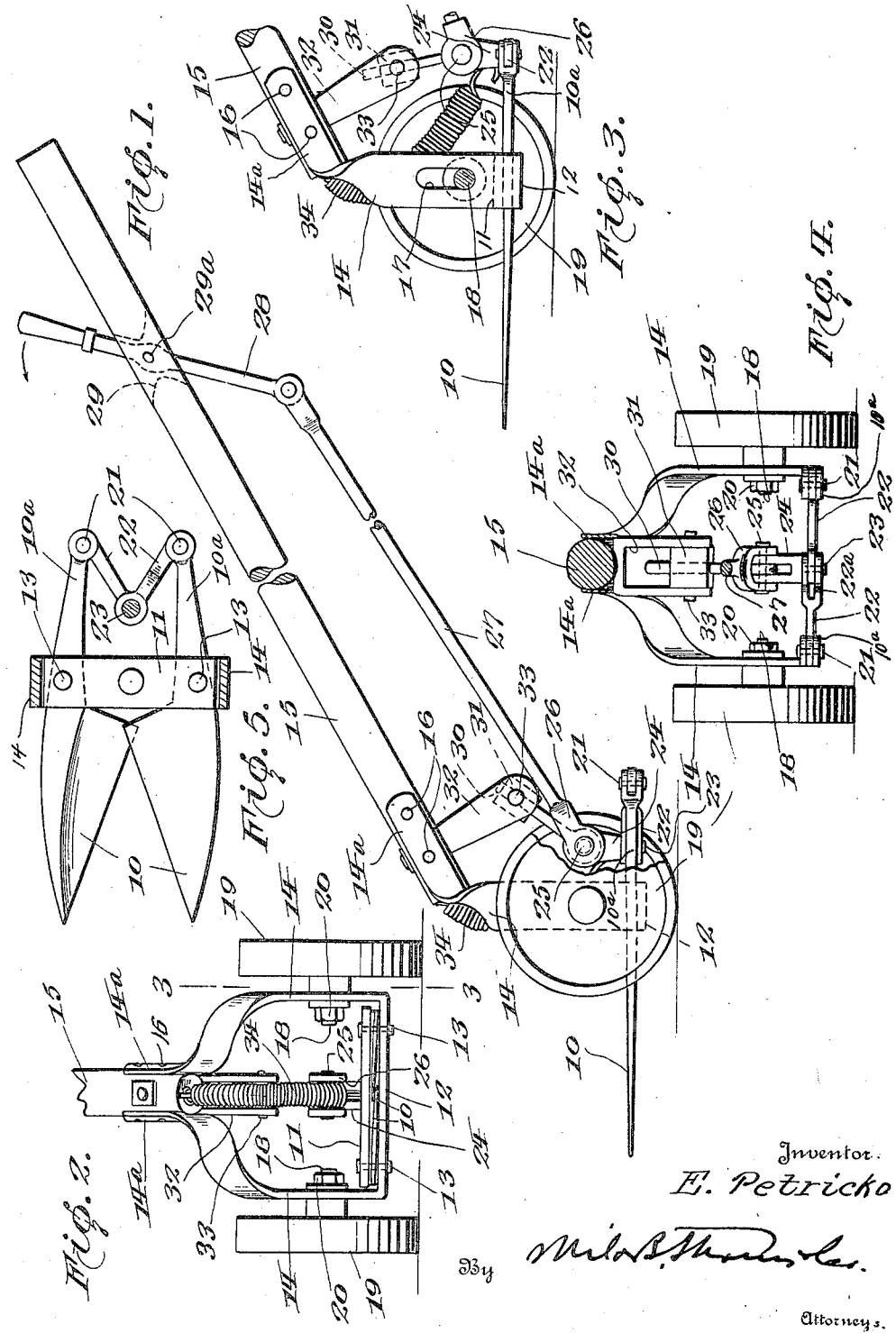
Inventor
E. Petricko
By
Attorneys Patented Mar. 27, 1923.

1,449,438

UNITED STATES PATENT OFFICE.

EMRICK PETRICKÓ, OF CHICAGO, ILLINOIS.

GRASS CLIPPER.

Application filed November 12, 1921. Serial No. 514,763.

*To all whom it may concern:*

Be it known that I, EMRICK PETRICKÓ, a subject of the King of Hungary, residing at Chicago, in the county of Cook and State of Illinois, have invented new and useful Improvements in Grass Clippers, of which the following is a specification.

This invention relates to devices for trimming the edges of lawns, the same consisting of a pair of shears carried by a wheeled support and operated by a lever mechanism.

The invention has for its object to provide a device of the kind stated embodying certain novel and improved features of construction and modes of operation to be described hereinafter, and in order that the same may be better understood, reference is had to the accompanying drawing, wherein:

Figure 1 is a side elevation of the device; Fig. 2 is a front elevation, partly broken away; Fig. 3 is a section on the line 3—3 of Fig. 2, showing the position of certain parts when the shear blades are closed; Fig. 4 is a rear elevation of the parts shown in Fig. 3, and Fig. 5 is a plan view showing the shear blades open or spread.

Referring specifically to the drawing, 10 denotes a pair of shear blades having shanks $10^a$ seating between top and bottom cross bars 11 and 12 and pivoted thereto, as shown at 13. The bars 11 and 12 are secured in vertically spaced relation to accommodate the shanks $10^a$. At its ends, the bar 12 has upward bends 14 which are twisted at their upper ends and bent rearwardly as shown at $14^a$ to extend along opposite sides of the lower end of a handle bar 15, to which latter they are secured by suitable fasteners 16. The upturned ends 14 of the bar 12 have vertical slots 17 to seat the axles 18 of the ground wheels 19 on which the device is supported. The axles 18 are vertically adjustable in the slots 17 so that the wheels 19 may be set as high or as low as desired and thus fix the spacing of the shear blades 10 from the ground. When in operation, the blades 10 are horizontal as shown in Fig. 1. Any suitable means may be provided for securing the axles 18 in the slots 17, the drawing showing nuts 20 for this purpose.

To the rear ends of the shanks $10^a$ of the blades 10 are pivoted, as shown at 21, links 22, which latter are pivotally connected, as shown at 23, one of the links being forked at its end, as shown at $22^a$ in Fig. 4, to straddle the corresponding end of the other link.

The pivot 23 which connects the links 22 has an upstanding yoke 24 carrying a cross pin 25, and the yoke 24 is straddled by a yoke 26 at the lower end of a rod 27 connected at its upper end to a hand-lever 28 working in a slot 29 in the rearwardly extending handle bar 15, and pivoted thereto as shown at $29^a$.

Between the branches of the yoke 24, the pin 25 pivotally supports a stem 30 which slidably seats at its outer end in a hole in a pivoted block 31 carried by a bracket 32 depending from and supported by the handle bar 15, said bracket being forked and the block seating between the fork branches and being pivoted thereto as shown at 33.

When the blades 10 are open or spread, the links 22 extend forwardly and convergingly between the shanks $10^a$, as shown in Fig. 5. If now the lever 28 is swung in the direction of the arrow shown in Fig. 1, the rod 27 is drawn rearwardly, by which the links 22 are swung to straighten out and to extend straight across and in alinement between the rear ends of the shanks $10^a$. This action of course spreads the shanks $10^a$ at their rear ends and brings the blades 10 together, the action being similar to a toggle. Upon swinging the lever 28 rearwardly, the links 22 are swung forwardly to converging position between the shanks $10^a$, whereupon the blades 10 are made to open or spread in an obvious manner. During both operations, the stem 30 slides in the hole in the block 31, and also swings, due to its pivotal connection with the pin 25, and the pivoted mounting of the block 31. The device is of course pushed and guided along the edge of the lawn by the handle bar 15.

A spring 34 is also employed for assisting the spread or opening of the blades 10, one end of said spring being anchored to the forward end of the handle bar 15, and the other end being connected to the yoke 24.

I claim:

1. A lawn-edge trimmer comprising a supporting frame including a cross bar having upturned ends which are vertically slotted, a cutter carried by the cross bar, ground wheels supporting the frame, and axles carrying said wheels, said axles being adjustably mounted in the aforesaid slots in the upturned ends of the cross bar.

2. A lawn-edge trimmer comprising a wheeled supporting frame, a pair of shear blades pivotally supported by said frame, a pair of links connected one to each of said blades, a pivotal connection between said links, an actuating means connected to said pivotal connection, a swiveled block carried by the frame, and a stem slidably supported by said block, said stem being separate from the actuating means and pivotally connected to the aforesaid connection between the links.

3. A lawn-edge trimmer comprising a wheeled supporting frame, a pair of shear blades pivotally supported by said frame, a pair of links connected one to each of said blades, a pivotal connection between the links, said connection including a yoke, an actuating means connected to the yoke, a swiveled block carried by the frame, and a stem slidably supported by said block, said stem being separate from the actuating means and pivotally connected to the yoke.

4. A lawn-edge trimmer comprising a wheeled supporting frame, a pair of shear blades pivotally supported by said frame, a pair of links connected one to each of said blades, a pivotal connection between the links, said connection including a yoke, a cross pin carried by the yoke, an actuating means connected to said cross pin, a pivoted stem carried by the cross pin, and a swiveled block carried by the frame and slidably engageable by the stem.

In testimony whereof I affix my signature.

EMRICK PETRICKÓ.